United States Patent
Barmichev et al.

(10) Patent No.: US 12,110,112 B2
(45) Date of Patent: Oct. 8, 2024

(54) GALLEY CART STOWAGE SYSTEM FOR A GALLEY OF AN AIRCRAFT

(71) Applicant: THE BOEING COMPANY, Chicago, IL (US)

(72) Inventors: Sergey D. Barmichev, Chicago, IL (US); Mithra M. K. V. Sankrithi, Bremerton, WA (US)

(73) Assignee: THE BOEING COMPANY, Chicago, IL (US)

( * ) Notice: Subject to any disclaimer, the term of this patent is extended or adjusted under 35 U.S.C. 154(b) by 162 days.

(21) Appl. No.: 17/828,092

(22) Filed: May 31, 2022

(65) Prior Publication Data
US 2022/0380052 A1 Dec. 1, 2022

Related U.S. Application Data

(60) Provisional application No. 63/195,195, filed on Jun. 1, 2021.

(51) Int. Cl.
*B64D 11/04* (2006.01)
*B64D 11/00* (2006.01)

(52) U.S. Cl.
CPC .......... *B64D 11/04* (2013.01); *B64D 11/0007* (2013.01)

(58) Field of Classification Search
CPC ............................ B64D 11/04; B64D 11/0007
See application file for complete search history.

(56) References Cited

U.S. PATENT DOCUMENTS

| | | | |
|---|---|---|---|
| 3,517,899 A | 6/1970 | Vernon | |
| 4,022,404 A * | 5/1977 | Greiss | B64D 11/0007 186/40 |
| RE32,176 E | 6/1986 | Vernon | |
| 4,660,787 A | 4/1987 | Sprenger et al. | |
| 5,074,496 A * | 12/1991 | Rezag | B64D 11/04 244/118.1 |
| 5,159,994 A | 11/1992 | Luria | |

(Continued)

FOREIGN PATENT DOCUMENTS

WO 2005066022 A2 7/2005

OTHER PUBLICATIONS

Lee "Zodiac Aerospace Galleys & Equipment" Mastering the Elements.

(Continued)

*Primary Examiner* — Michael C Zarroli
*Assistant Examiner* — Colin Zohoori
(74) *Attorney, Agent, or Firm* — Jay J. Hoette; The Small Patent Law Group, LLC

(57) ABSTRACT

A galley cart stowage system for stowing galley carts in a galley of an aircraft includes a lower cart compartment and an upper cart compartment located above the lower cart compartment both configured to receive at least one galley cart. At least one vertical conveyance device extends between the cart compartments to move the galley carts between the cart compartments. A galley workspace having a workspace volume is located between the cart compartments. The galley workspace has a countertop movable between a deployed position and a clearance position to form an opening between the lower cart compartment and the upper cart compartment to allow movement of the galley carts between the lower cart compartment and the upper cart compartment.

27 Claims, 11 Drawing Sheets

(56) References Cited

U.S. PATENT DOCUMENTS

| | | | |
|---|---|---|---|
| 5,322,244 A * | 6/1994 | Dallmann | B64D 11/0007 |
| | | | 244/118.1 |
| 6,305,643 B1 | 10/2001 | Sankrithi | |
| 6,412,603 B1 * | 7/2002 | Nervig | B64D 11/04 |
| | | | 244/118.1 |
| 8,087,611 B2 * | 1/2012 | Arnold | B64D 11/04 |
| | | | 244/118.1 |
| 9,284,054 B2 | 3/2016 | Saint-Jalmes et al. | |
| 9,557,122 B2 * | 1/2017 | Schult | F28F 27/00 |
| 9,821,912 B2 * | 11/2017 | Nojiri | B64D 11/04 |
| 2005/0133308 A1 | 6/2005 | Reysa et al. | |
| 2005/0218265 A1 | 10/2005 | Harrington et al. | |
| 2005/0230540 A1 | 10/2005 | Harrington et al. | |
| 2006/0186268 A1 | 8/2006 | Harrington et al. | |
| 2012/0325960 A1 | 12/2012 | Saint-Jalmes et al. | |
| 2013/0311534 A1 | 11/2013 | Langhammer | |
| 2015/0028157 A1 * | 1/2015 | Hoogeveen | B64D 11/04 |
| | | | 244/118.1 |
| 2021/0129992 A1 | 5/2021 | Sankrithi | |

OTHER PUBLICATIONS

Formation Design Group "Airbus SPICE Galley Innovation" Core77 (5 pages).

Extended European Search Report for corresponding EP Application No. 22169275.9-1004 dated Sep. 16, 2022.

* cited by examiner

GALLEY CART STOWAGE SYSTEM FOR A GALLEY OF AN AIRCRAFT

CROSS-REFERENCE TO RELATED APPLICATIONS

This application relates to and claims priority benefits from U.S. Provisional Patent Application No. 63/195,195, filed Jun. 1, 2021, which is hereby incorporated by reference in its entirety.

BACKGROUND

The present disclosure relates generally to systems and methods of stowing galley carts in a galley of an aircraft.

Commercial aircraft are typically fitted with galleys for storing and preparing food provided in meal services to passengers. Galleys include storage spaces for galley carts, which in turn contain food trays, beverages, and the like. For long-range flights in which two or three meals are served, large galleys are needed to accommodate the large number of galley carts needed to store the food and waste. These large galleys occupy a lot of space, and as a result, reduce the number of passenger seats that can be fitted on the passenger deck. This reduces the amount of revenue for the airline. Some known galley cart stowage systems provide galley cart stowage in the aircraft lower lobe or in the crown. However, such galley cart stowage systems typically use automated components that, upon failure, do not allow manual access to the lower storage area or the upper stowage area.

A need exists for a commercial aircraft galley arrangement in which a large number of galley carts may be stowed and accessed during flight without interfering with galley service.

SUMMARY

In one embodiment, a galley cart stowage system for stowing galley carts in a galley of an aircraft is provided. The galley cart stowage system includes a lower cart compartment defining a lower galley cart cavity configured to receive a first galley cart of the galley carts. The galley cart stowage system includes an upper cart compartment located above the lower cart compartment. The upper cart compartment defines an upper galley cart cavity configured to receive a second galley cart of the galley carts. The galley cart stowage system includes vertical conveyance devices extending between the lower cart compartment and the upper cart compartment to move the second galley cart between the lower cart compartment and the upper cart compartment. The galley cart stowage system includes a galley workspace having a workspace volume located above the lower cart compartment and located below the upper cart compartment. The galley workspace has a countertop. The countertop is movable between a deployed position and a clearance position. The countertop is located between the lower cart compartment and the upper cart compartment to block movement of the second galley cart between the lower cart compartment and the upper cart compartment in the deployed position. The countertop is moved to the clearance position to form an opening between the lower cart compartment and the upper cart compartment to allow movement of the second galley cart between the lower cart compartment and the upper cart compartment.

In another embodiment, an aircraft is provided and includes a cabin having a cabin floor. The cabin has a cabin ceiling at a crown of the aircraft. The aircraft includes a galley within the cabin. The galley includes a plurality of walls including a first side wall, a second side wall, and a rear wall extending between the first side wall and the second side wall opposite a front of the galley. The galley has a galley footprint between the first side wall, the second side wall, the rear wall, and the front. The galley includes a galley cart stowage system for stowing galley carts. The galley cart stowage system includes a lower cart compartment within the galley footprint defining a lower galley cart cavity configured to receive a first galley cart of the galley carts. The lower galley cart cavity defined by the first side wall, the second side wall and the rear wall. The lower cart compartment has lower doors at the front of the galley to close the lower galley cart cavity. The lower doors open to the cabin to provide access to the lower galley cart cavity from within the cabin. The galley cart stowage system includes an upper cart compartment within the galley footprint defining an upper galley cart cavity configured to receive a second galley cart of the galley carts. The upper galley cart cavity is defined by the first side wall, the second side wall, and the rear wall. The upper cart compartment has upper doors at the front of the galley to close the upper galley cart cavity. The upper doors open to the cabin to provide access to the upper galley cart cavity from within the cabin. The galley cart stowage system includes vertical conveyance devices extending between the lower cart compartment and the upper cart compartment to move the second galley cart between the lower cart compartment and the upper cart compartment. The galley cart stowage system includes a galley workspace has a workspace volume within the galley footprint located above the lower cart compartment and located below the upper cart compartment. The galley workspace has a countertop. The countertop movable between a deployed position and a clearance position. The countertop located between the lower cart compartment and the upper cart compartment to block movement of the second galley cart between the lower cart compartment and the upper cart compartment in the deployed position. The countertop moved to the clearance position to form an opening between the lower cart compartment and the upper cart compartment to allow movement of the second galley cart between the lower cart compartment and the upper cart compartment.

In a further embodiment, a method of stowing galley carts in a galley of an aircraft is provided including positioning a plurality of the galley carts in a lower galley cart cavity of a lower cart compartment below a countertop of a galley workspace. The method includes positioning a plurality of the galley carts in an upper galley cart cavity of an upper cart compartment above the galley workspace. The method including moving the countertop from a deployed position to a clearance position to form an opening between the lower cart compartment and the upper cart compartment. The method includes moving the galley carts between the upper cart compartment and the lower cart compartment in a generally vertical direction through the opening using a vertical conveyance device extending between the lower cart compartment and the upper cart compartment.

The features and functions that have been discussed can be achieved independently in various embodiments or may be combined in yet other embodiments, further details of which can be seen with reference to the following description and drawings.

DETAILED DESCRIPTION

Figure 1:
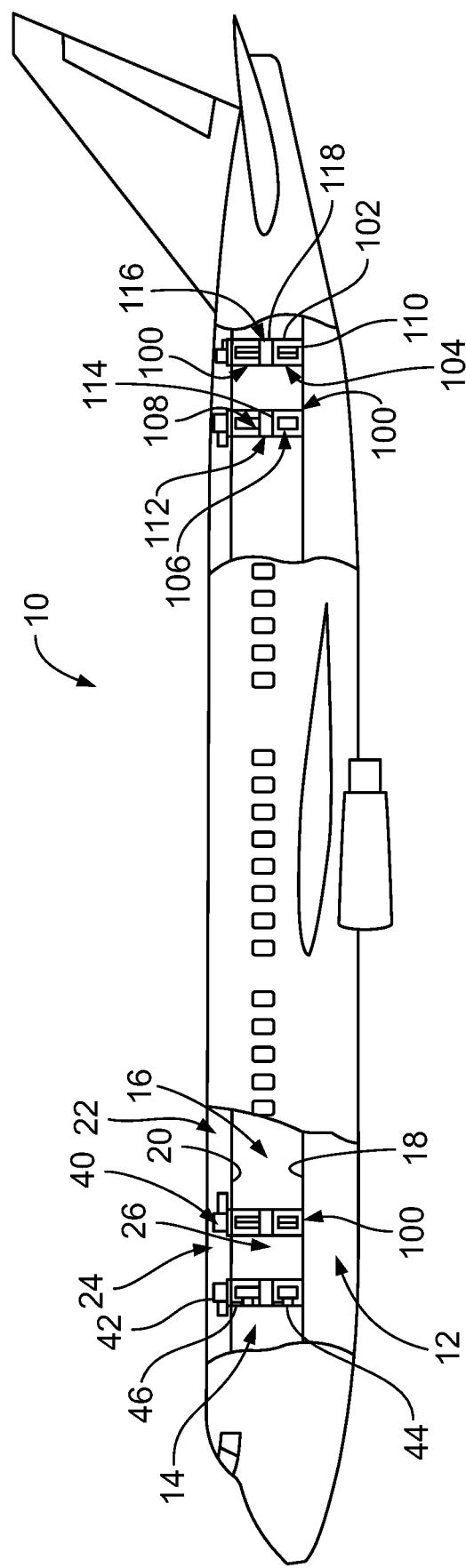
FIG. 1 is a cross-sectional schematic view of an aircraft in accordance with an exemplary embodiment.

The following detailed description of certain embodiments will be better understood when read in conjunction with the appended drawings. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" or "an embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Described herein are various embodiments of a galley cart stowage system for stowing galley carts in a galley of an aircraft. The galley cart stowage system includes a galley workspace having a countertop and a workspace volume located above a lower cart compartment and located below an upper cart compartment. In various embodiments, the lower and upper cart compartments define lower and upper galley cart cavities that receive the galley carts such that the galley carts are located below the galley workspace and above the galley workspace. The lower galley cart compartment is defined by walls and have lower doors at a front that open to the galley to provide access to the cavity. The upper galley cart compartment is defined by walls and has upper doors at a front of the upper cart compartment that open to the galley to provide access to the cavity. In various embodiments, both the lower and the upper cart compartments are accessible by personnel from the galley space within the cabin of the aircraft. In various embodiments, one or more vertical conveyance devices extend between the lower and upper cart compartments to move galley carts therebetween. In various embodiments, the galley workspace is reconfigurable to allow the galley conveyance devices to move the galley carts between the upper and lower cart compartments. In various embodiments, the countertop is movable to a clearance position to allow the galley carts to pass between the upper and lower cart compartments. Stacking the cart compartments above and below the galley workspace increases the number of galley carts that may be stowed within a footprint of the galley space. As such, more cabin space may be available for passenger seating.

FIG. 1 is a cross-sectional schematic view of an aircraft 10 in accordance with an exemplary embodiment. The aircraft 10 includes a cargo area 12 within a lower portion of the aircraft 10. The cargo area 12 includes one or more cargo compartments. The aircraft 10 includes a cabin 14 defining a passenger area 16 above the cargo area 12. The cabin 14 includes a cabin floor 18 and a cabin ceiling 20. The cargo area 12 is separated from the passenger area 16 by the cabin floor 18. A crown 22 of the aircraft 10 defining an overhead area 24 is separated from the passenger area 16 by the cabin ceiling 20.

The aircraft 10 includes one or more galleys 100 in the cabin 14 (shown in cross section). Each galley 100 is accessible by personnel from within the passenger area 16, such as from a galley space 26 within the passenger area 16. The galley 100 is a catering area accessible by the crew of the aircraft 10 for stowing items used to serve the passengers, such as food items, beverage items, and the like. The galley 100 includes a plurality of walls 102 extending between the cabin floor 18 and the cabin ceiling 20. The galley 100 includes a galley cart stowage system 104 for stowing galley carts 110 in the galley 100. The galley carts 110 may be standard galley carts, such as ATLAS carts, KSSU carts, ACE carts, and the like. The walls 102 define cart compartments, such as a lower cart compartment 106 and an upper cart compartment 108 for stowing the galley carts 110. In various examples, the lower cart compartment 106 and the upper cart compartment 108 both extend the entire width of the galley 100. In alternative examples, the upper cart compartment 108 may extend over only a portion of the lower cart compartment 106. The lower cart compartment 106 may have a first width and the upper cart compartment 108 may have a second width narrower than the first width. In such embodiments, the lower cart compartment 106 is configured to hold a greater number of the galley carts 110 than the upper cart compartment 108. In some examples, the lower cart compartment 106 has a width to accommodate six galley carts 110 while the upper cart compartment 108 extends half the width of the lower cart compartment 106 to accommodate three galley carts 110. Other examples are possible in alternative embodiments. In various examples, the galley 100 may extend transversely across a portion of the aircraft 10 and be forward facing or aft facing in the aircraft 10. In other various embodiments, the galley 100 may be arranged longitudinally within the aircraft 10 such that the galley 100 faces the right side of the aircraft 10 or the left side of the aircraft 10. The galley 100 may be horseshoe-shaped in other various embodiments.

The walls 102 define a galley workspace 112 usable by the crew to prepare meals and use for food and beverage service. The galley workspace 112 includes a countertop 114 and a workspace volume 116 above the countertop 114 defining the working space for the crew. A back wall 118 is located at the rear of the workspace volume 116. The countertop 114 and the workspace volume 116 are located forward of the back wall 118. In an exemplary embodiment, the cart compartments 106 are stacked to stow the galley carts 110 both below and above the galley workspace 112. The galley carts 110 are accessible from the galley space 26. For example, the galley carts 110 above the galley workspace 112 are accessible from the galley space 26 by crew members. The crew members may stand on a step-stool, an elevatable floor panel, a standing platform that may be winched or otherwise lifted upward to access the upper galley carts 110. Space dedicated to the galley 100 is unusable for passenger seats or other purposes such as lavatories, and thus it may be desirable for aircraft manufacturers to reduce the footprint of the galley 100 in order to increase the seating area of the passenger area 16 to increase revenue of each flight for aircraft operators. Stacking the cart compartments 106, 108 to include stowage for the galley carts 110 above the galley workspace allows an increased number of galley carts 110 within the given galley footprint (for example, compared to unstacked galleys).

In various embodiments, the galley workspace 112 is reconfigurable to allow the galley carts 110 to move in a vertical direction between the upper and lower cart compartments 106, 108. For example, the countertop 114 is movable to a clearance position to allow the galley carts 110 to pass between the upper cart compartment 108 and the lower cart compartment 106. The countertop 114 may be slid forward to form a space or opening behind the countertop 114 to allow the galley carts 110 to pass between the upper cart compartment 108 and the lower cart compartment 106. In various embodiments, the back wall 118 is movable with the countertop 114 to allow the galley carts 110 to pass between the upper cart compartment 108 and the lower cart compartment 106 behind the back wall 118.

The galley 100 includes a galley cooling system 40 that provides cooled airflow for the galley 100. In various embodiments, components of the galley cooling system 40 are positioned above the galley 100 (e.g., in the crown 22 of the aircraft 10) above the cabin ceiling 20. In alternative embodiments, components of the galley cooling system 40 are positioned in the galley 100. In other alternative embodiments, components of the galley cooling system 40 are positioned below the galley 100 (e.g., in the cargo area 12 of the aircraft 10 below the cabin floor 18). In an exemplary embodiment, the galley cooling system 40 includes a heat exchanger 42 producing the cooled airflow. In various embodiments, the heat exchanger 42 is a chiller including a compressor, a condenser, an evaporator and an air handler to produce the cooled airflow. The galley cooling system 40 includes supply ducts 44 and return ducts 46 that circulate airflow through the cart compartments 106, 108. In various embodiments, the galley cooling system may include multiple heat exchangers 42. In other various embodiments, the galley cooling system 40 may use dry ice for cooling the galley carts 110. The galley carts 110 may be insulated carts. The galley walls may be insulated galley walls.

Figure 2:
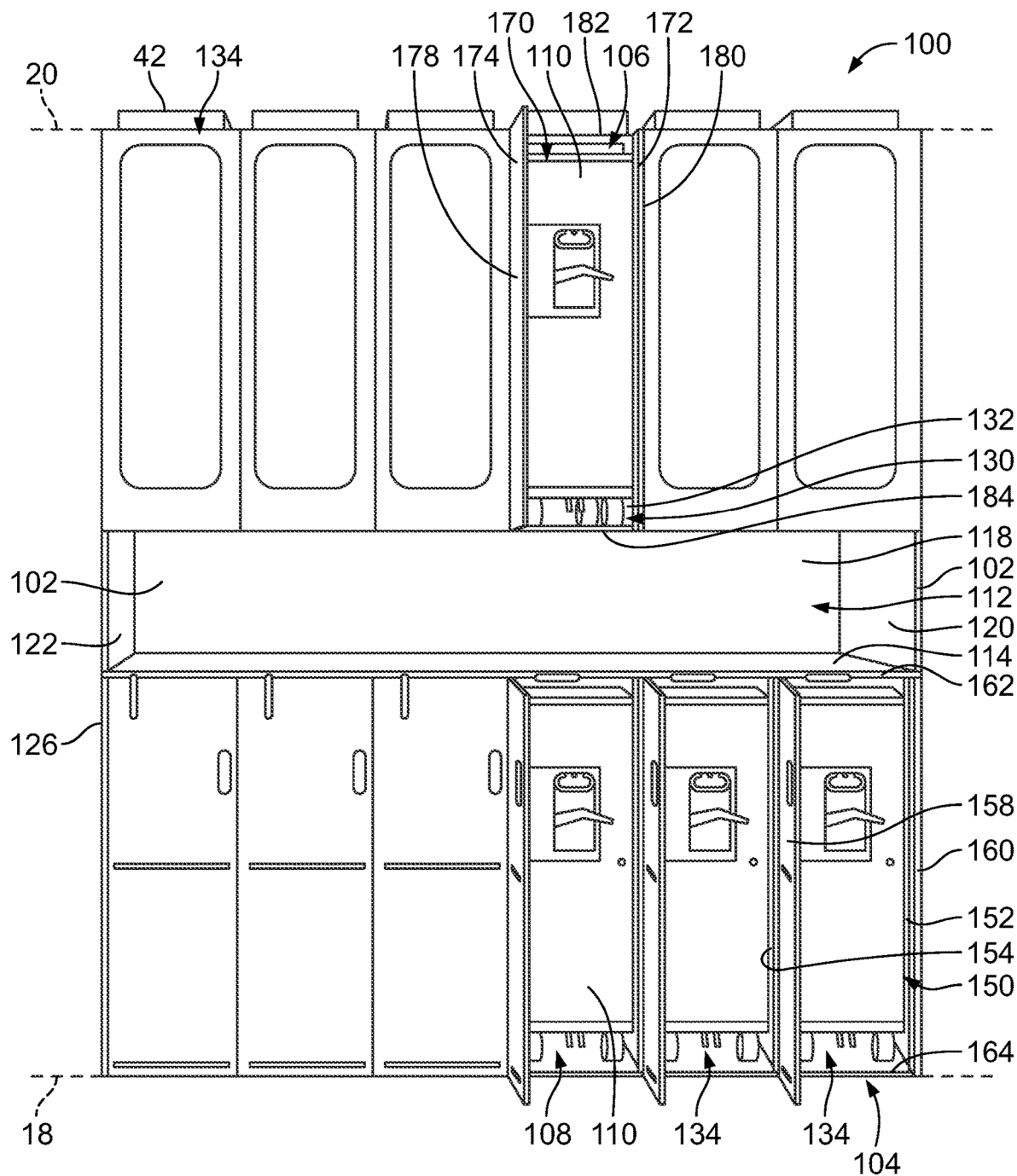
FIG. 2 is a front view of the galley in accordance with an exemplary embodiment showing the galley cart stowage system for stowing the galley carts.
Figure 3:
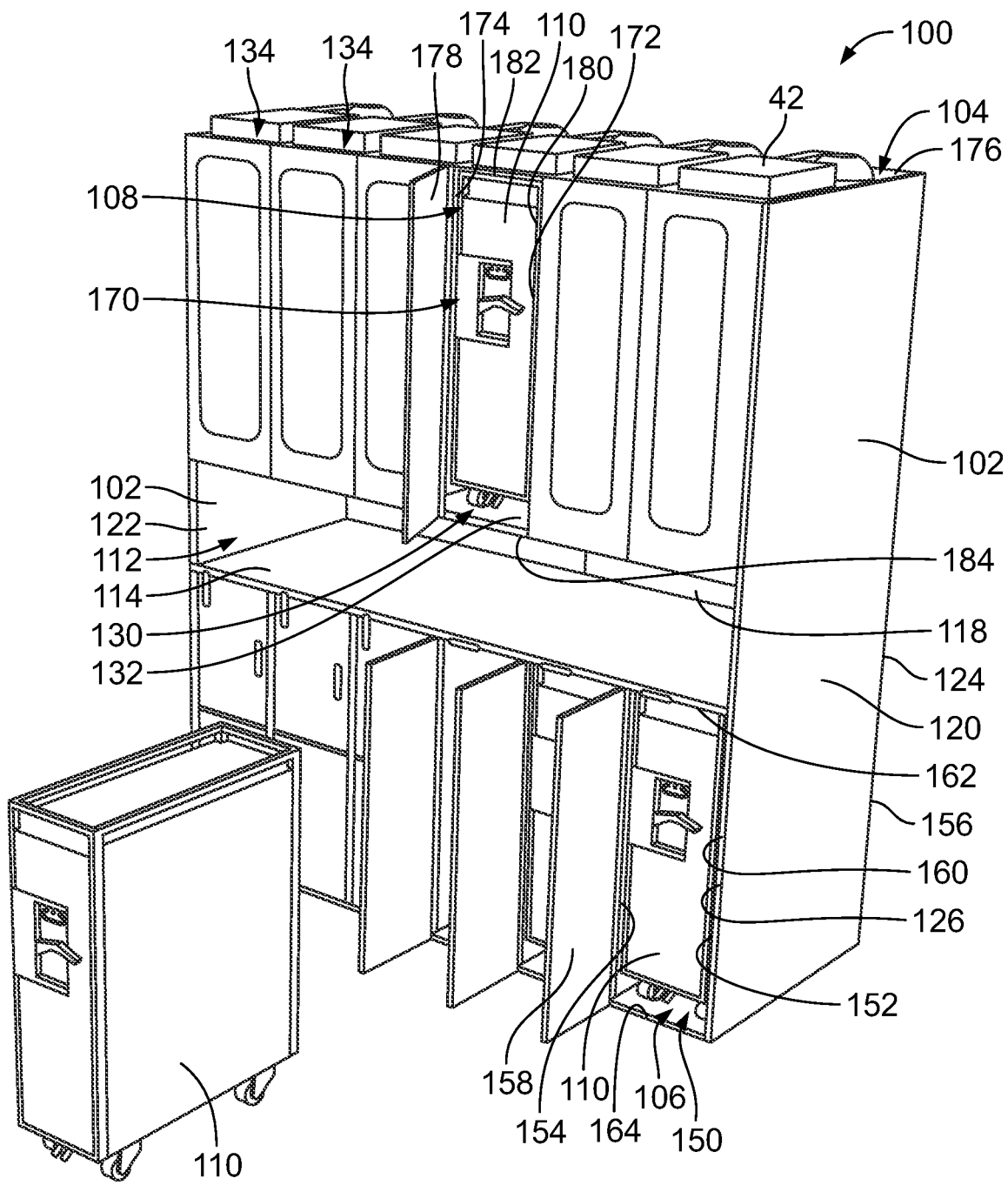
FIG. 3 is a front perspective view of the galley in accordance with an exemplary embodiment showing the galley cart stowage system for stowing the galley carts.

FIG. 2 is a front view of the galley 100 in accordance with an exemplary embodiment showing the galley cart stowage system 104 for stowing the galley carts 110. FIG. 3 is a front perspective view of the galley 100 in accordance with an exemplary embodiment showing the galley cart stowage system 104 for stowing the galley carts 110.

The walls 102 of the galley 100 extend between the cabin floor 18 and the cabin ceiling 20. The walls 102 include a first side wall 120 at a left side of the galley 100 and a second side wall 122 at a right side of the galley 100 opposite the first side wall 120. The walls 102 includes a rear wall 124 (FIG. 3) at a rear of the galley 100 opposite a front 126 of the galley 100. The first and second side walls 120, 122 extend from the rear wall 124 to the front 126 of the galley 100. The galley 100 has a footprint on the cabin floor 18. The footprint occupies a surface area of the cabin floor 18 defined by the side walls 120, 122, the rear wall 124 and the front 126. In an exemplary embodiment, the lower cart compartment 106 is contained within the footprint and the upper cart compartment 108 is contained within the footprint. In an exemplary embodiment, the galley workspace 112 is contained within the footprint. In various examples, the galley 100 may be arranged in the aircraft 10 such that the front 126 of the galley 100 faces the aft end of the aircraft 10. In other various embodiments, the galley 100 may be arranged in the aircraft 10 such that the front 126 of the galley 100 faces the forward end of the aircraft 10. In other various embodiments, the galley 100 may be arranged longitudinally within the aircraft 10 such that the front 126 of the galley 100 faces the right side of the aircraft 10 or faces the left side of the aircraft 10.

The galley cart stowage system 104 includes the lower cart compartment 106 and the upper cart compartment 108 with the galley workspace 112 between the lower cart compartment 106 and the upper cart compartment 108. The galley cart stowage system 104 includes one or more vertical conveyance devices 130 for transferring the galley carts 110 between the lower and upper cart compartments 106, 108. For example, the vertical conveyance devices 130 may lift galley carts 110 loaded into the lower cart compartment 106 into the upper cart compartment 108 for storage in the upper cart compartment 108 until needed. In an exemplary embodiment, the vertical conveyance devices 130 may transition the galley carts 110 through the galley workspace 112. The vertical conveyance devices 130 may include an elevator, a lift, a jacking system, a jack screw, a winch, a belt, a chain, and the like. In various examples, the vertical conveyance devices 130 may include supporting trays 132 supporting the galley cart 110 (for example, the wheels resting on the supporting tray).

In an exemplary embodiment, the galley 100 is divided into a plurality of bays 134. Each bay 134 defines a portion of the lower compartment 106, a portion of the upper compartment 108 and a portion of the galley workspace 112. The bay 134 has a width of one galley cart 110 and is configured to hold one galley cart 110 in the lower portion of the bay 134 (in the lower cart compartment 106) and is configured to hold one galley cart 110 in the upper portion of the bay 134 (in the upper cart compartment 108). In an exemplary embodiment, each bay 134 has a corresponding vertical conveyance device 130 for transferring the galley carts 110 between the upper and lower portions of the bay 134. In various embodiments, each bay 134 has a corresponding heat exchanger 42 (for example, chiller).

The lower cart compartment 106 defines a lower galley cart cavity 150 configured to receive a plurality of the galley carts 110. In the illustrated embodiment, the lower galley cart cavity 150 holds six galley carts 110; however, the lower galley cart cavity 150 may be sized to hold greater or fewer galley carts 110. The lower galley cart cavity 150 is defined by a lower left side wall 152, a lower right side wall 154, and a lower rear wall 156 (FIG. 3) between the lower left and right side walls 152, 154. The lower rear wall 156 may be defined by the rear wall 124. The lower left side wall 152 may be defined by the first side wall 120. The lower right side wall 154 may be defined by the second side wall 122. In an exemplary example, the lower cart compartment 106 includes optional lower doors 158 at a front 160 of the lower cart compartment 106 to close the lower galley cart cavity 150. The lower doors 158 open to the galley space 26 in front of the galley 100 to provide access to the lower galley cart cavity 150, such as to remove the galley carts 110. The lower cart compartment 106 extends between a top 162 and a bottom 164. The countertop 114 is provided at the top 162. The bottom 164 is provided at the cabin floor 18 and contained within the footprint of the galley 100.

The upper cart compartment 108 defines an upper galley cart cavity 170 configured to receive a plurality of the galley carts 110. In the illustrated embodiment, the upper galley cart cavity 170 holds six galley carts 110; however, the upper galley cart cavity 170 may be sized to hold greater or fewer galley carts 110. The upper galley cart cavity 170 is defined by an upper left side wall 172, an upper right side wall 174, and an upper rear wall 176 between the upper left and right side walls 172, 174. The upper rear wall 176 may be defined by the rear wall 124. The upper left side wall 172 may be defined by the first side wall 120. The upper right side wall 174 may be defined by the second side wall 122. In an exemplary embodiment, the upper cart compartment 108 includes optional upper doors 178 at a front 180 of the upper cart compartment 108 to close the upper galley cart cavity 170. The upper doors 178 are located immediately above the galley workspace 112. The upper doors 178 open to the galley space 26 in front of the galley 100 to provide access to the upper galley cart cavity 170.

The upper galley carts 110 are accessible from the galley space 26 by crew members, such as by standing on a step-stool, an elevatable floor panel, a standing platform that may be winched or otherwise lifted upward to access the upper galley carts 110. In an exemplary embodiment, the galley workspace 112 is of sufficiently small height such that a median stature crew member standing on a stepladder, such as a two-step stepladder, can reach and access a highest location food tray of the upper galley cart 110 in the upper galley cart cavity 170. For example, the galley workspace 112 may be between 0.3 meters and 0.5 meters (12"-20") such that the upper cart compartment 108 is low enough that it may be easily accessible by the crew member. In various embodiments, the top of the upper galley cart cavity 170 is not more than 2.6 meters (8.5') above the floor of the galley 100. Optionally, the top of the upper galley cart cavity 170 is at approximately 2.4 meters (8.0'). The upper galley cart cavity 170, and the upper galley carts 110 in the upper galley cart cavity 170, are positioned within the galley 100 at a height allowing access to the top of the upper galley cart cavity 170 by a crew member, such as with the crew member standing on a stepladder. As such, the crew member has backup access to the meal trays and drinks in the upper galley carts 110 in case of failure of the conveyance system during flight. The top of the galley cart 110 is accessible by having a small elevation, such as by a stepstool or elevatable platform or floor panel, going up a small distance, such as 1 to 2 feet, in the aisleway standing area in front of the galley 100.

In an exemplary embodiment, the upper cart compartment 108 shares a footprint with the lower cart compartment 106. The upper cart compartment 108 extends between a top 182 and a bottom 184. The galley workspace 112 is located below the bottom 184. The top 182 is provided at the cabin ceiling 20. As such, the upper doors 178 are contained within and accessible within the cabin 14, such as to access the galley carts 110. For example, in the situation of a malfunction of the vertical conveyance devices 130, the upper doors 178 are opened to retrieve the contents of the galley carts 110.

The galley workspace 112 is located between (for example, aligned along a vertical axis) the upper cart compartment 108 and the lower cart compartment 106. The countertop 114 and the working space is located above the galley carts 110 in the lower cart compartment 106. The countertop 114 and the working space is located below the galley carts 110 in the upper cart compartment. In various embodiments, the back wall 118 is located between (for example, aligned along a vertical axis) the galley carts 110 in the lower and upper cart compartments 106, 108. During normal use, the countertop 114 and the back wall 118 are in a deployed or normal use position; however, the countertop 114 and the back wall 118 are movable relative to the walls 102 of the galley 100 to a clearance position (see FIGS. 4 and 5). In the deployed position, the countertop 114 and the back wall 118 block movement of the galley carts 110 between the lower and upper cart compartments 106, 108. In the clearance position, the countertop 114 and the back wall 118 are clear and unobstructed of the galley carts 110 to allow the galley carts 110 to move freely between the lower and upper cart compartments 106, 108.

Figure 4:
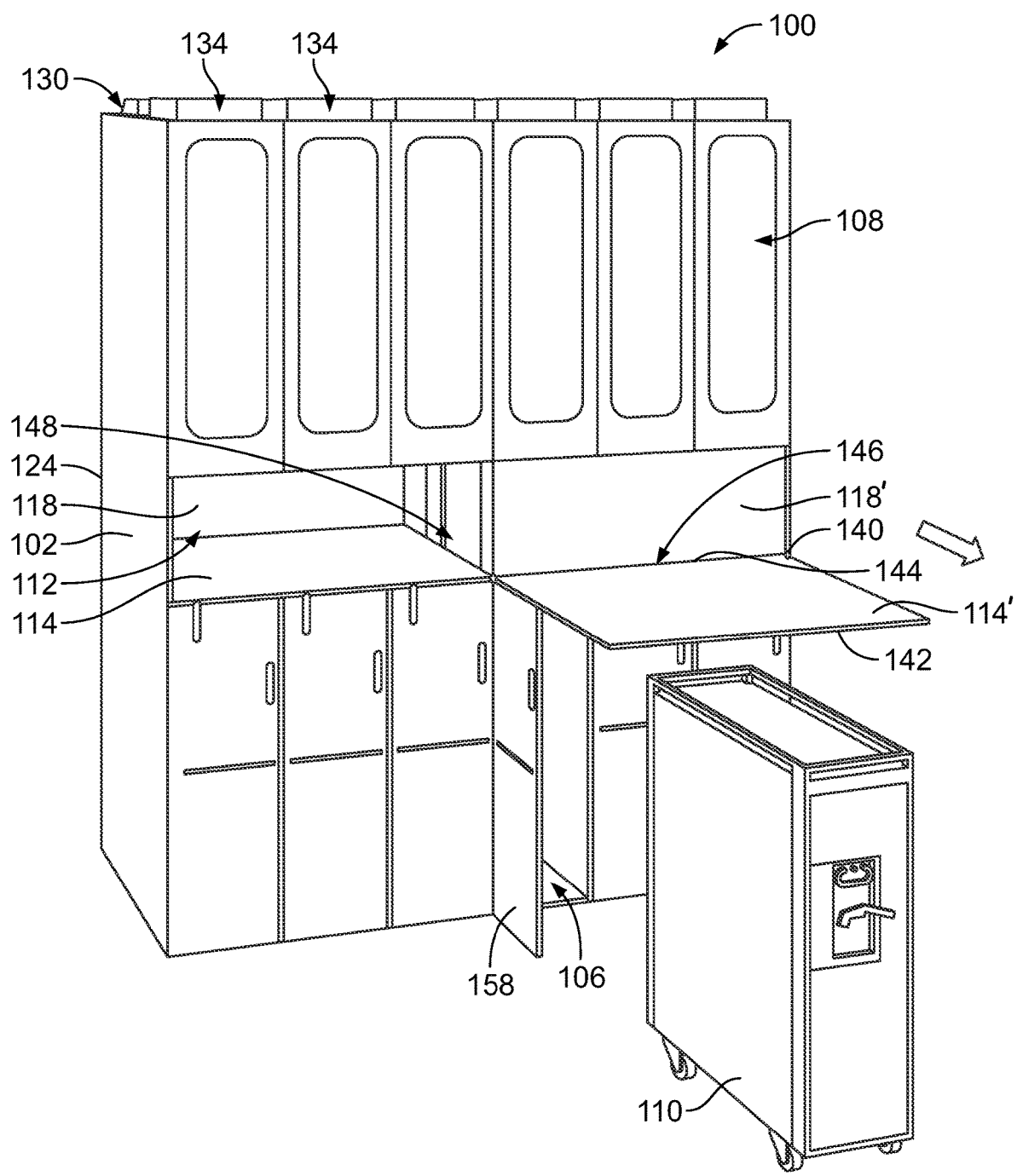
FIG. 4 is a front perspective view of the galley in accordance with an exemplary embodiment showing the countertop and the back wall in a clearance position.
Figure 5:
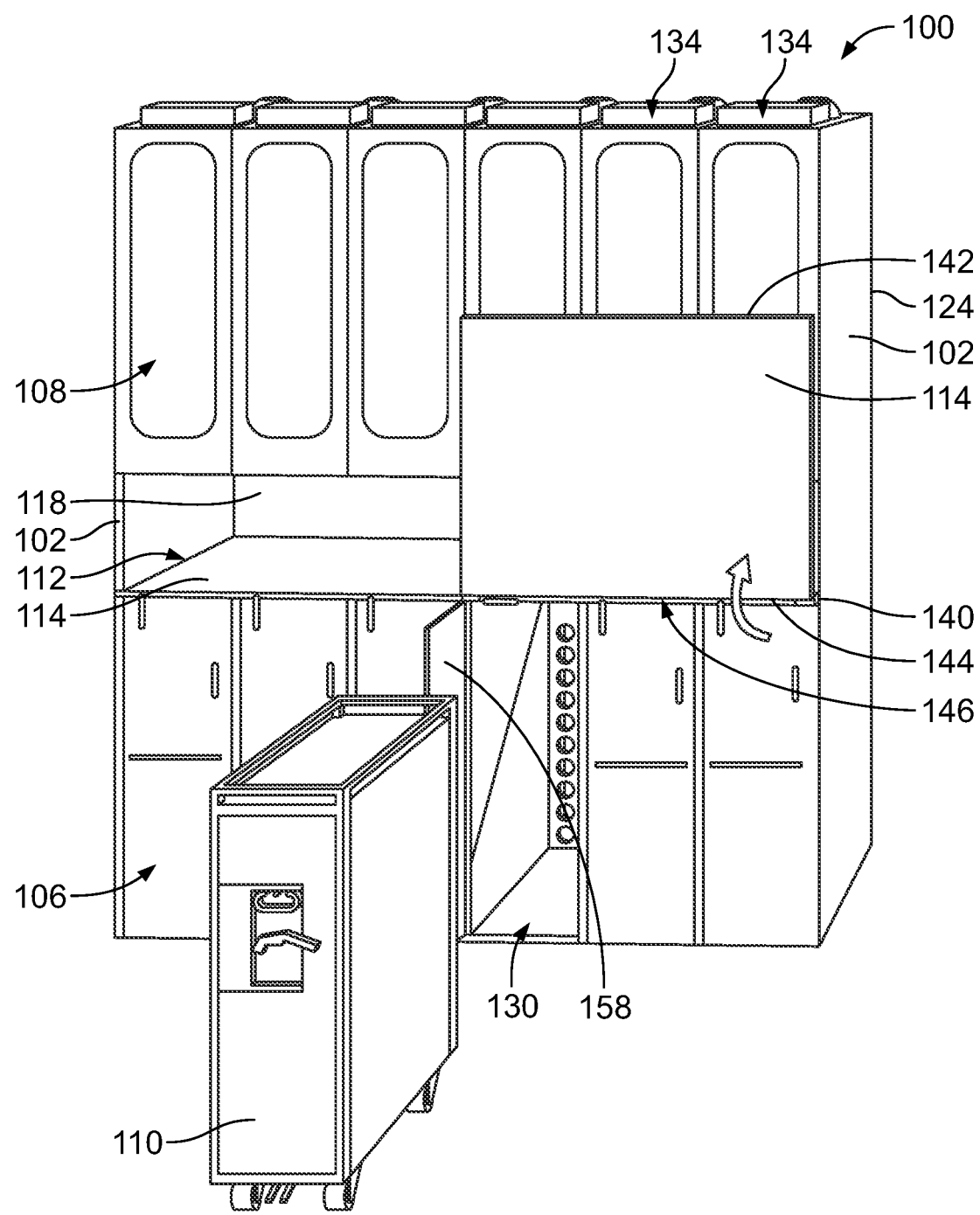
FIG. 5 is a front perspective view of the galley in accordance with an exemplary embodiment showing the countertop and the back wall in a clearance position.

FIG. 4 is a front perspective view of the galley 100 in accordance with an exemplary embodiment showing the countertop 114 and the back wall 118 in the clearance position. FIG. 5 is a front perspective view of the galley 100 in accordance with an exemplary embodiment showing the countertop 114 and the back wall 118 in the clearance position.

In an exemplary embodiment, the countertop 114 and the back wall 118 are connected and movable together. Alternatively, the countertop 114 and the back wall 118 may be separate and movable separately from each other. In various embodiments, the countertop 114 and the back wall 118 are movable in a horizontal sliding direction between the deployed position (FIGS. 2 and 3) and the clearance position (FIGS. 4 and 5). For example, a slide 140 may be provided at the galley workspace 112. The countertop 114 and the back wall 118 are coupled to the slide and movable between the deployed position and the clearance position by the slide 140. Other devices may be provided in alternative embodiments, such as a track, a rail, and the like to allow the countertop 114 and the back wall 118 to move relative to the walls 102. In other various embodiments, rather than sliding the countertop 114 and the back wall 118 forward, the countertop 114 may be folded upward against the back wall 118 to a clearance position and the galley carts 110 may be moved between the lower and upper compartments 106, 108 in front of the folded countertop 114. In alternative embodiments, the countertop 114 and/or the back wall 118 may be removed, such as by releasing fasteners (for example, clips or latches) and removing the countertop 114 and/or the back wall 118 from the galley 100.

In an exemplary embodiment, the countertop 114 extends between a front edge 142 and a rear edge 144. The back wall 118 is provided at the rear edge 144. The countertop 114 is perpendicular to the back wall 118. The back wall 118 is parallel to and spaced apart from (for example, positioned forward of) the rear wall 124 of the galley 100. The spacing between the back wall 118 and the rear wall 124 changes as the back wall 118 is moved between the deployed and clearance positions. For example, the spacing is increased in the clearance position to provide a space to allow the galley carts 110 to move in a vertical direction between the lower and upper cart compartments 106, 108. The countertop 114 is movable to the clearance position to position the rear edge 144 forward of the galley carts 110 to allow movement of the galley carts 110 behind the countertop 114 and the back wall 118. For example, in the deployed position, the rear edge 144 is positioned rearward of the front sides of the galley carts 110 (and may be positioned rearward of the rear sides of the galley carts 110. However, in the clearance position, the rear edge 144 is positioned forward of the front sides of the galley carts 110 such that the countertop 114 does not obstruct movement of the galley carts between the lower cart compartment 106 and the upper cart compartment 108.

In various embodiments, the countertop 114 is coupled to the back wall 118 at a hinge 146 to allow the countertop 114 to pivot relative to the back wall 118. For example, once pulled out to the clearance position, the countertop 114 may be folded upward (FIG. 5) or downward to a generally vertical orientation to reduce the impact of the countertop 114 extending into the working space on the crew members.

In the clearance position, the countertop 114 and the back wall 118 are in clearance positions relative to the galley carts 110 and the vertical conveyance devices 130 to allow movement of the galley carts 110 between the lower cart compartment 106 and the upper cart compartment 108. When the countertop 114 and the back wall 118 are moved forward to the clearance position, an opening 148 is defined rearward of the countertop 114 and the back wall 118. The opening 148 is defined by the spacing between the back wall 118 and the rear wall 124. The opening 148 is sized to allow the galley carts 110 to pass in a vertical direction between the lower cart compartment 106 and the upper cart compartment 108. For example, the opening 148 has a depth greater than a depth of the galley cart 110. In various embodiments, the back wall 118 is aligned with the lower doors 158 in the clearance position such that the opening 148 is at least as deep as the lower cart compartment 106.

In various embodiments, the countertop 114 and the back wall 118 may be segmented into countertop sections 114' and back wall sections 118'. The countertop sections 114' are movable relative to each other and the back wall sections 118' are movable relative to each other. In the illustrated embodiment, the countertop 114 and the back wall 118 are divided into two countertop sections 114' and two back wall sections 118'; however, the countertop 114 and the back wall 118 may be further divided into a greater number of sections, such as each bay 134 having corresponding sections. The sections may be easier to work with and move between the deployed and clearance positions compared to a single large countertop 114 and back wall 118 unit.

Figure 6:
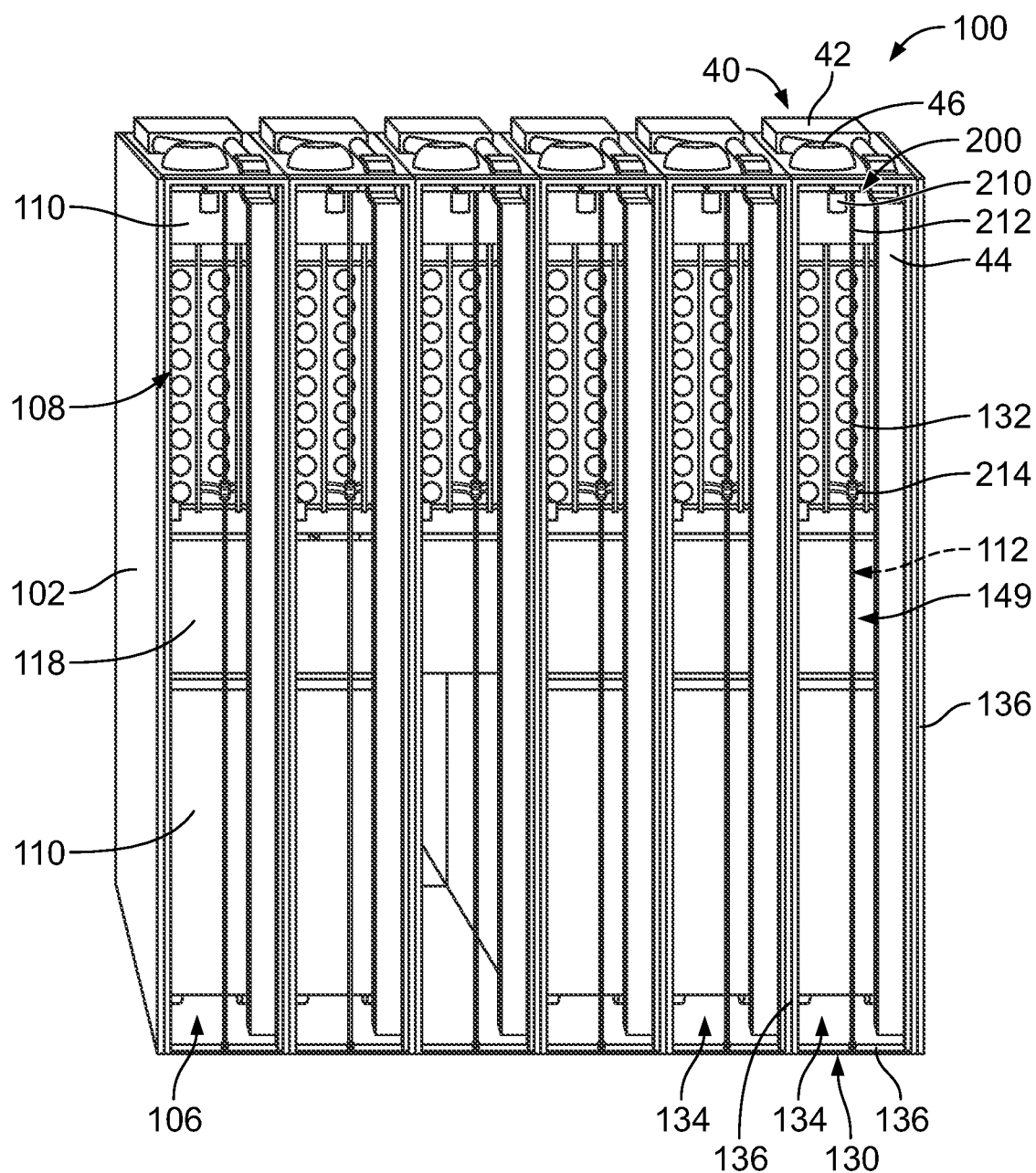
FIG. 6 is a rear perspective view of the galley in accordance with an exemplary embodiment, with the rear wall removed to illustrate the galley carts and the vertical conveyance devices.
Figure 7:
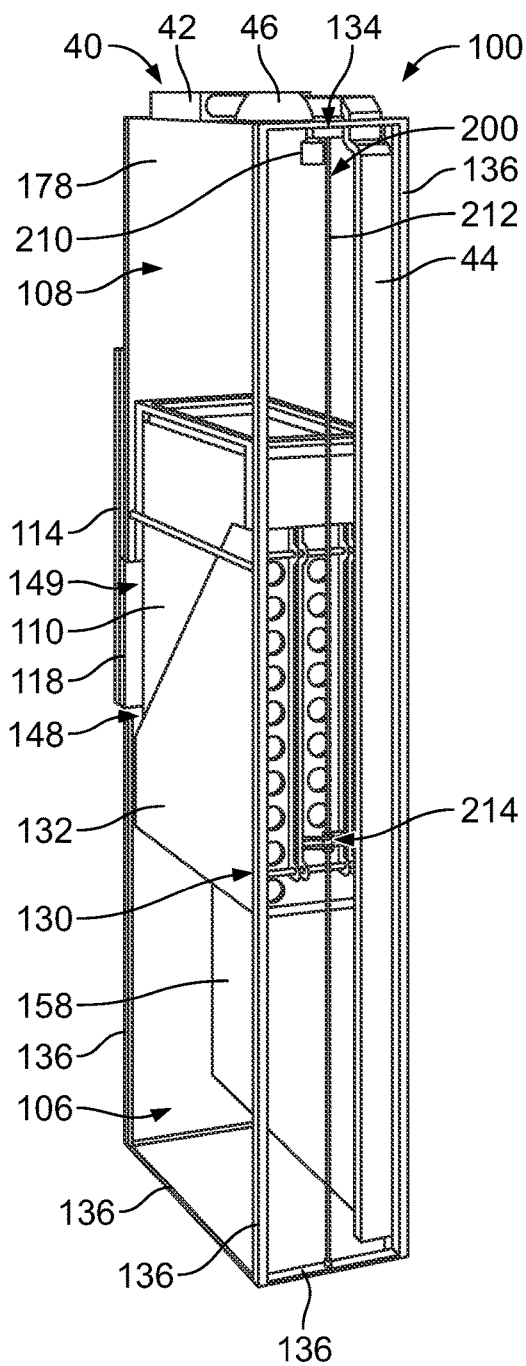
FIG. 7 is a rear perspective view of a portion of the galley in accordance with an exemplary embodiment showing one of the bays.

FIG. 6 is a rear perspective view of the galley 100 in accordance with an exemplary embodiment, with the rear wall 124 removed to illustrate the galley carts 110 and the vertical conveyance devices 130. FIG. 7 is a rear perspective view of a portion of the galley 100 in accordance with an exemplary embodiment showing one of the bays 134.

The galley 100 includes frame members 136 forming the bays 134. The frame members 136 include vertical frame members and horizontal frame members interconnected to form a framework for the galley 100. The frame members 136 may be metal frame members, such as L-shaped members, C-shaped members, T-shaped members, or other types of metal frame members. The lower and upper doors 158, 178 may be mounted to corresponding frame members 136. In various embodiments, the vertical conveyance devices 130 are coupled to corresponding frame members 136. The walls 102 may be coupled to the frame members 136.

The back wall 118 is shown in FIG. 6 near the rear of the galley 100. A vertical connecting chamber 149 is located rearward of the back wall 118. The vertical connecting chamber 149 is located behind the galley workspace 112. The vertical connecting chamber 149 connects the lower cart compartment 106 and the upper cart compartment 108. Components of the cooling system 40 may pass through the vertical connecting chamber 149 between the lower cart compartment 106 and the upper cart compartment 108. Components of the vertical conveyance devices 130 pass through the vertical connecting chamber 149. When the back wall 118 is moved forward to the clearance position, the size of the vertical connecting chamber 149 is increased to include the opening 148 (FIG. 7) between the lower cart compartment 106 and the upper cart compartment 108. The countertop 114 blocks access to the vertical connecting chamber 149 by the galley carts 110 in the deployed position. The back wall 118 blocks access to the vertical connecting chamber 149 by the galley carts 110 in the deployed position. However, the countertop 114 and the back wall 118 do not block the vertical connecting chamber 149 when in the clearance position. Rather, the vertical connecting chamber 149 is clear to allow movement of the galley carts 110 through the opening into and out of vertical connecting chamber 149 between the lower cart compartment 106 and the upper cart compartment 108.

The cooling system 40 includes the heat exchangers 42 at the top of the galley 100. The supply ducts 44 extend from the heat exchangers 42 to the lower cart compartment 106. The supply ducts may extend to the bottom of the lower cart compartment 106 to supply the cold air to the galley carts 110. The cold air cools the galley carts by air-over cooling. The air moves through the galley 100 using convection. For example, the used air moves upward using convection from the lower cart compartment 106 to the upper cart compartment 108. The return ducts 46 are provided in the upper cart compartment 108 to circulate the used air to the heat exchanger 42. In alternative embodiments, the supply ducts 44 may be provided in both the lower cart compartment 106 and the upper cart compartment 108 and the return ducts 46 may be provided in both the lower cart compartment 106 and the upper cart compartment 108. Other cooling systems may be provided in alternative embodiments, such as having a single heat exchanger for cooling multiple bays 134.

In an exemplary embodiment, each bay 134 has a corresponding vertical conveyance device 130. The vertical conveyance device 130 includes the tray 132 and a vertical actuator 200 operably coupled to the tray 132. The vertical actuator 200 moves the tray 132, and thus the galley cart 110 in the tray 132, vertically between the lower cart compartment 106 and the upper cart compartment 108. In various embodiments, the vertical actuator 200 is located behind the galley cart 110. In other various embodiments, the vertical actuator 200 is located at a side of the galley cart 110, such as between adjacent galley carts 110. The vertical actuator 200 may lift a single galley cart 110. Alternatively, the vertical actuator 200 may left multiple galley carts 110. In various embodiments, the vertical actuator 200 includes a motor 210 and a threaded drive shaft 212 rotated by the motor 210. The motor 210 is mounted to the galley 100, such as to the frame members 136. A carriage 214 is coupled to the threaded drive shaft 212 and movable along the threaded drive shaft 212. The carriage 214 is coupled to the tray 132 to move the tray 132 and lift or lower the galley cart 110. Rotation of the threaded drive shaft 212 causes vertical movement of the carriage 214 along the threaded drive shaft 212. The direction of rotation of the threaded drive shaft 212 moves the carriage 214, and thus the tray 132 and galley cart 110, either upward or downward. Other types of vertical actuators may be used in alternative embodiments, such as a winch, a chain, a belt, and the like.

Figure 8:
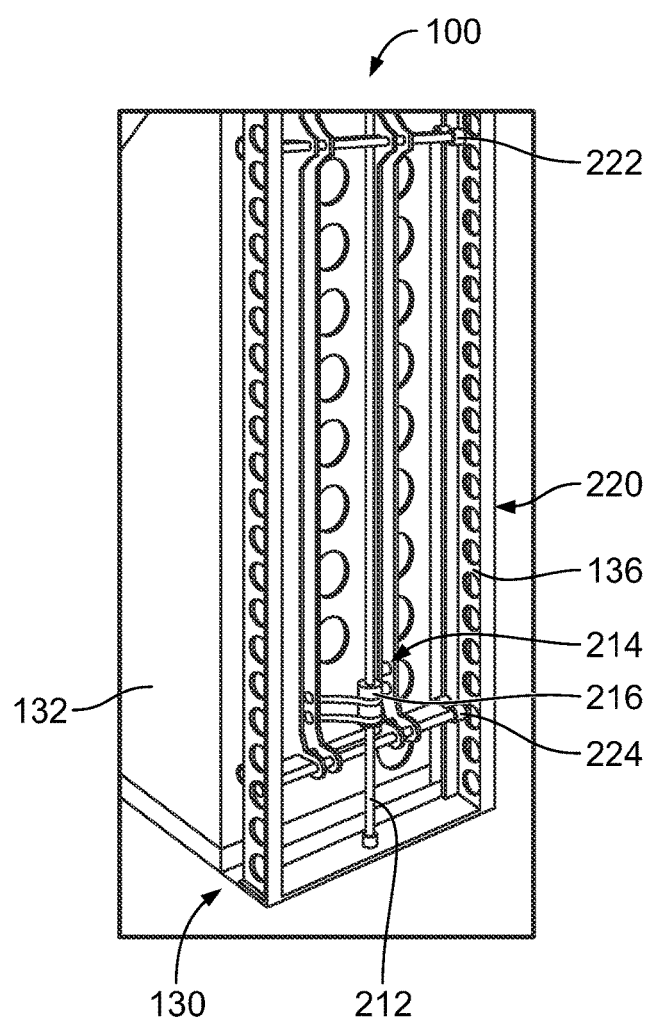
FIG. 8 is a rear perspective view of a portion of the galley in accordance with an exemplary embodiment showing the vertical conveyance device.

FIG. 8 is a rear perspective view of a portion of the galley 100 in accordance with an exemplary embodiment showing the vertical conveyance device 130. The tray 132 includes a bracket 220 at the rear of the tray 132. Upper rollers 222 and lower rollers 224 are coupled to the bracket 220 to guide movement of the tray 132 along the frame members 136. The carriage 214 includes a nut 216 coupled to the threaded drive shaft 212 to control the location of the carriage 214 along the threaded drive shaft 212.

Figure 9:
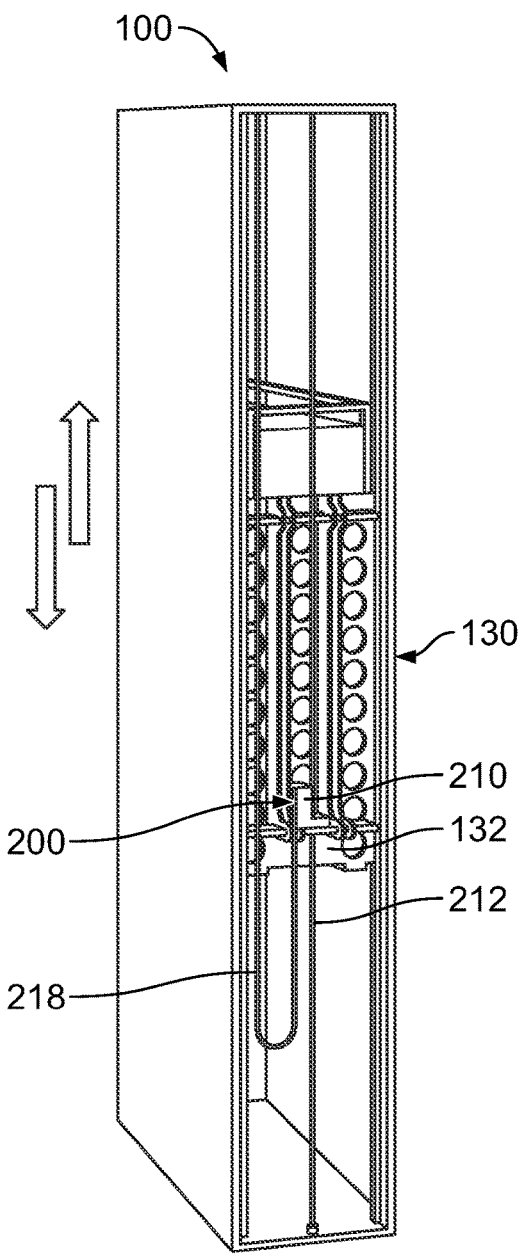
FIG. 9 is a rear perspective view of a portion of the galley showing the vertical conveyance device in accordance with an exemplary embodiment.
Figure 10:
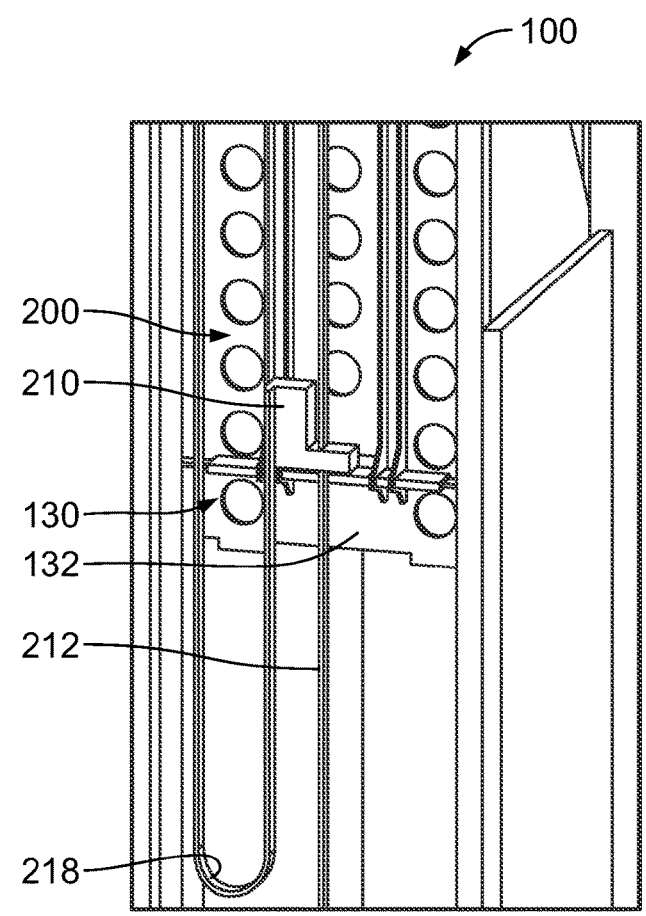
FIG. 10 is an enlarged rear perspective view of a portion of the galley showing the vertical conveyance device in accordance with an exemplary embodiment.

FIG. 9 is a rear perspective view of a portion of the galley 100 showing the vertical conveyance device 130 in accordance with an exemplary embodiment. FIG. 10 is an enlarged rear perspective view of a portion of the galley 100 showing the vertical conveyance device 130 in accordance with an exemplary embodiment. In the illustrated embodiment, the motor 210 of the vertical actuator 200 is coupled to the tray 132. The threaded drive shaft 212 is static and does not rotate. The motor 210 is a geared motor that interfaces with the threaded drive shaft 212 to ascend and descend on the threaded drive shaft 212. For example, a nut gear is rotated by the motor 210 to ride along the threaded drive shaft 212 as the nut gear is rotated. A power cable 218, such as a caterpillar electrical cable, is coupled to the motor 210. The power cable 218 is flexible to move with the tray 132.

Figure 11:
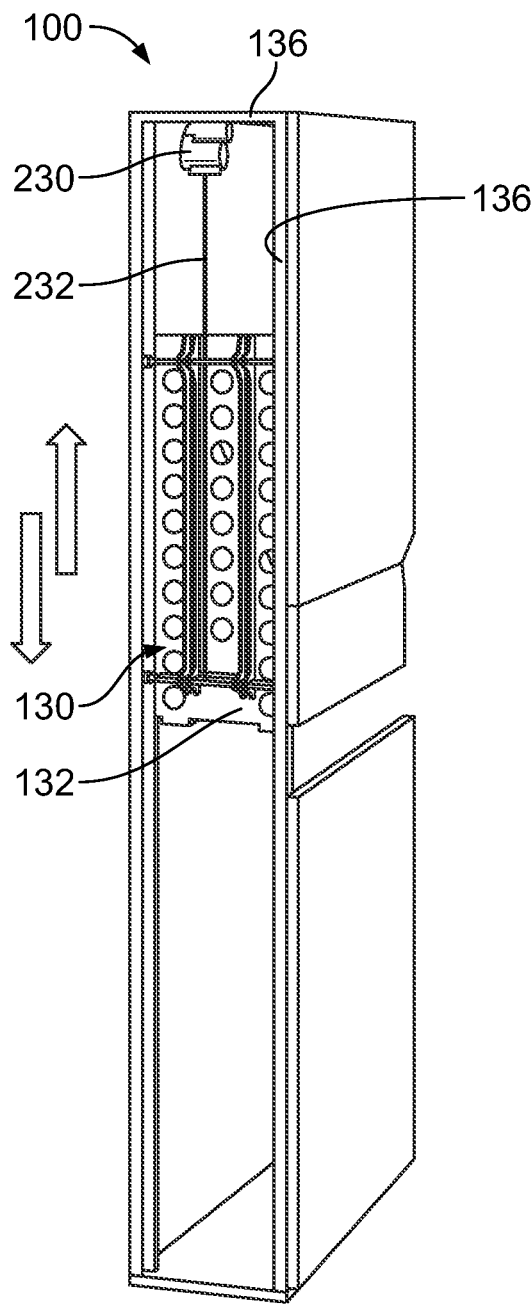
FIG. 11 is a rear perspective view of a portion of the galley showing the vertical conveyance device in accordance with an exemplary embodiment.
Figure 12:
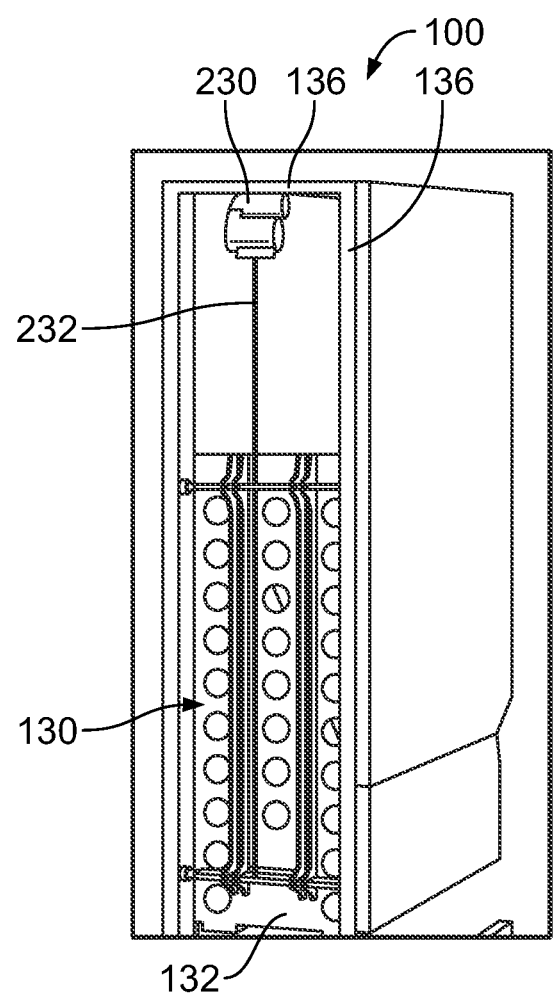
FIG. 12 is an enlarged rear perspective view of a portion of the galley showing the vertical conveyance device in accordance with an exemplary embodiment.

FIG. 11 is a rear perspective view of a portion of the galley 100 showing the vertical conveyance device 130 in accordance with an exemplary embodiment. FIG. 12 is an enlarged rear perspective view of a portion of the galley 100 showing the vertical conveyance device 130 in accordance with an exemplary embodiment. In the illustrated embodiment, the vertical conveyance device 130 includes a winch 230 and a winch cable 232. The winch 230 is mounted to the galley 100, such as to the frame members 136, such as at the top of the galley 100. The winch cable 232 is coupled to the tray 132. The winch 230 is operated to wind up or release the winch cable 232 to pull the tray 132 up and down.

Figure 13:
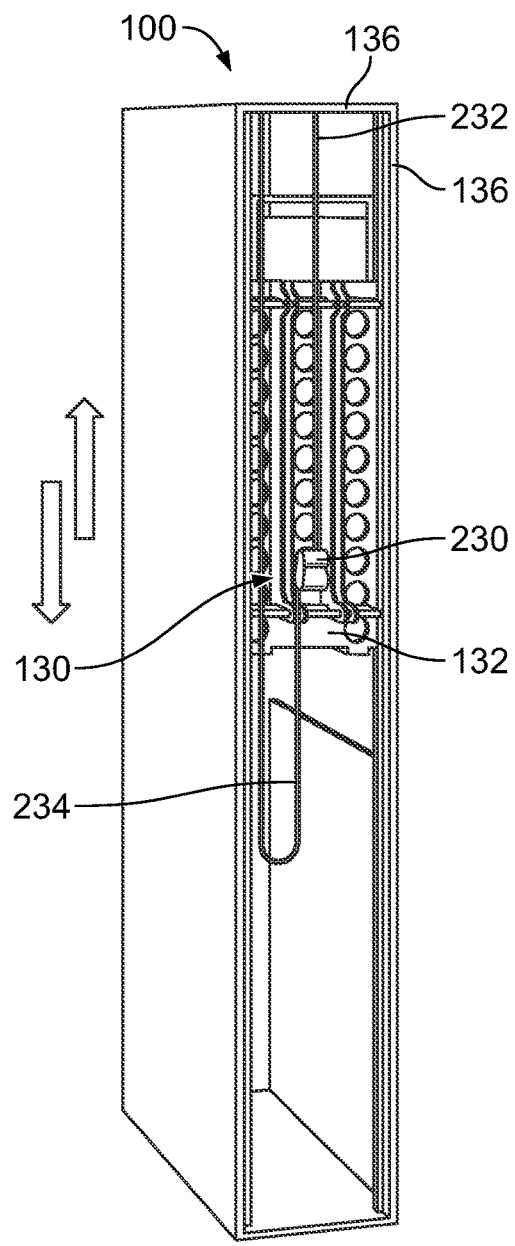
FIG. 13 is a rear perspective view of a portion of the galley showing the vertical conveyance device in accordance with an exemplary embodiment.
Figure 14:
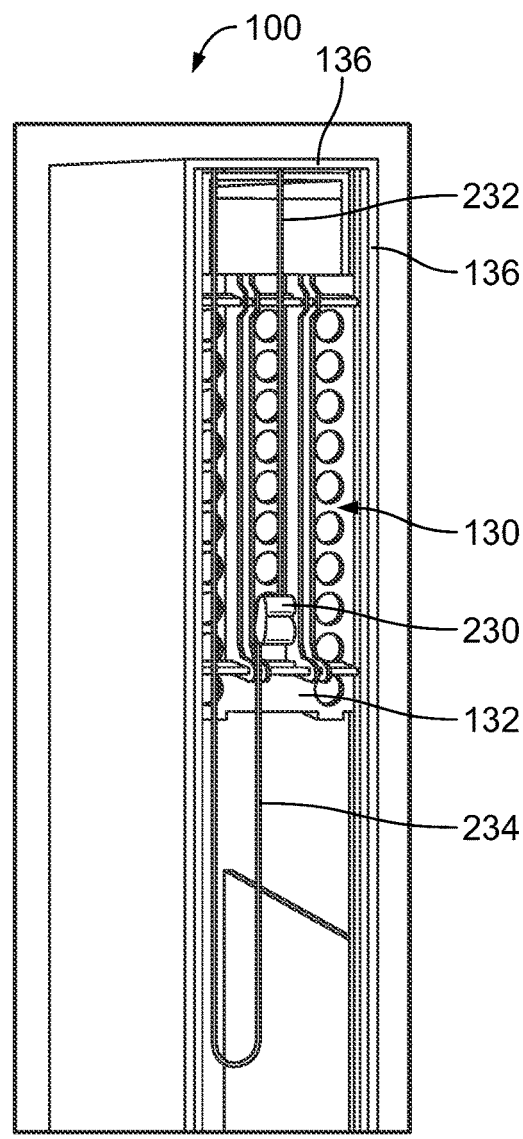
FIG. 14 is an enlarged rear perspective view of a portion of the galley showing the vertical conveyance device in accordance with an exemplary embodiment.

FIG. 13 is a rear perspective view of a portion of the galley 100 showing the vertical conveyance device 130 in accordance with an exemplary embodiment. FIG. 14 is an enlarged rear perspective view of a portion of the galley 100 showing the vertical conveyance device 130 in accordance with an exemplary embodiment. In the illustrated embodiment, the winch 230 is mounted to the tray 132. The distal end of the winch cable 232 is mounted to the frame members 136, such as at the top of the galley 100. The winch 230 is operated to pull the tray 132 up and down. An electric cable 236 is coupled to the winch 230 to power the winch 230.

Figure 15:
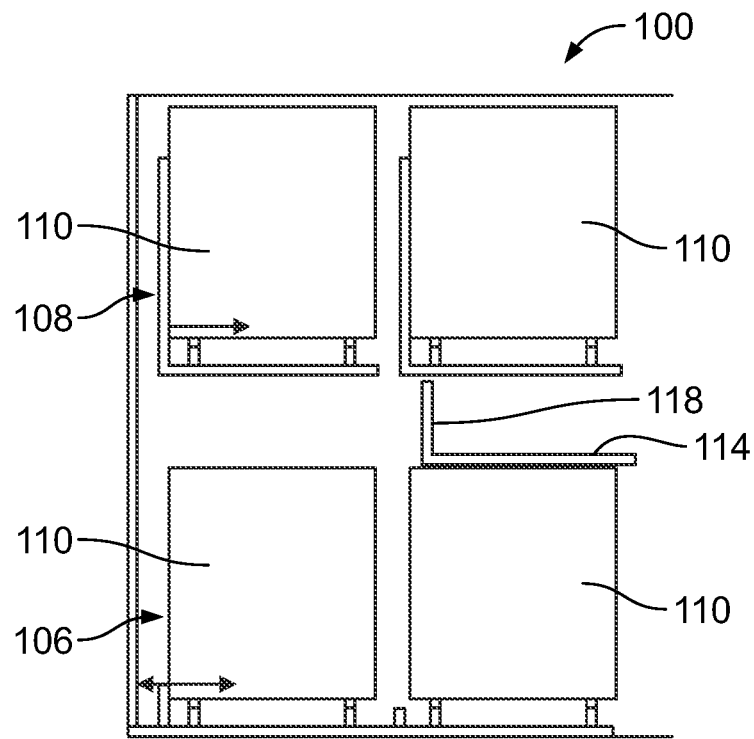
FIG. 15 is a side view of a portion of the galley in accordance with an exemplary embodiment.
Figure 16:
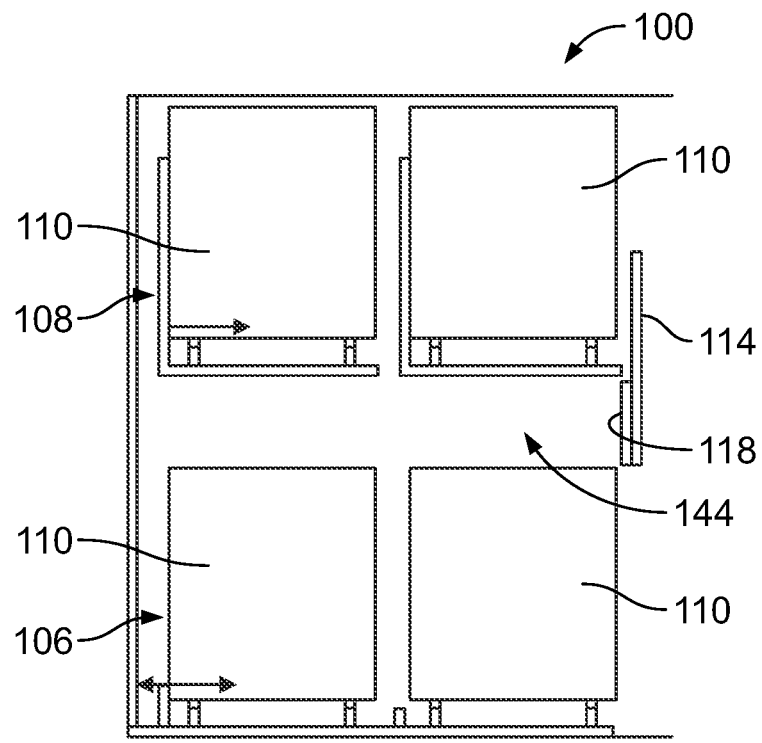
FIG. 16 is a side view of a portion of the galley in accordance with an exemplary embodiment.

FIG. 15 is a side view of a portion of the galley 100 in accordance with an exemplary embodiment. FIG. 16 is a side view of a portion of the galley 100 in accordance with an exemplary embodiment. In the illustrated embodiment, the galley 100 is a double depth galley having two rows of galley carts 110 in both the lower cart compartment 106 and the upper cart compartment 108. The lower cart compartment 106 is a double depth compartment configured to receive the galley carts 110 in two rows, stacked front to rear, between the lower rear wall 156 and the lower doors 158. The upper cart compartment 108 is a double depth compartment configured to receive the galley carts 110 in two rows, stacked front to rear, between the upper rear wall 176 and the upper doors 178. Vertical actuators may be provided for each of the galley carts. Alternatively, each vertical actuator may be used to lift multiple galley carts. The countertop may be a double depth countertop covering both rows of galley carts 110. The countertop may have a hinged section at the middle to allow the countertop to be folded in half. FIG. 15 illustrates the countertop 114 and the back wall 118 in the deployed position. FIG. 16 illustrates the countertop 114 and the back wall 118 in the clearance position showing the opening 144, which allows vertical movement of the galley carts 110 between the lower cart compartment 106 and the upper cart compartment 108. In other various embodiments, rather than a double depth galley, the galley 100 may be a 1.5 depth galley configured to receive a full depth galley cart and a half depth galley cart.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from the scope thereof. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A galley cart stowage system for stowing galley carts in a galley of an aircraft, the galley cart stowage system comprising:

a lower cart compartment defining a lower galley cart cavity configured to receive a first galley cart of the galley carts;

an upper cart compartment located above the lower cart compartment, the upper cart compartment defining an upper galley cart cavity configured to receive a second galley cart of the galley carts;

a vertical conveyance device extending between the lower cart compartment and the upper cart compartment to move the second galley cart between the lower cart compartment and the upper cart compartment; and a galley workspace having a workspace volume located above the lower cart compartment and located below the upper cart compartment, the galley workspace having a countertop forming a working surface in the galley workspace, the countertop movable between a deployed position and a clearance position, the countertop located between the lower cart compartment and the upper cart compartment to block movement of the second galley cart between the lower cart compartment and the upper cart compartment in the deployed position, the countertop moved to the clearance position to form an opening between the lower cart compartment and the upper cart compartment to allow movement of the second galley cart through the workspace volume of the galley workspace between the lower cart compartment and the upper cart compartment.

2. The galley cart stowage system of claim 1, wherein the countertop is aligned along a vertical axis with the lower cart compartment and the upper cart compartment in the deployed position, the countertop being offset from the lower cart compartment and the upper cart compartment in the clearance position.

3. The galley cart stowage system of claim 1, wherein the countertop includes a front edge and a rear edge, the rear edge being positioned rearward of the galley carts in the deployed position, the rear edge being positioned forward of the galley carts in the clearance position.

4. The galley cart stowage system of claim 1, wherein the countertop is movable in a horizontal sliding direction from the deployed position to the clearance position to form the opening.

5. The galley cart stowage system of claim 1, wherein the galley workspace includes a back wall at a rear of the galley workspace, the back wall being movable with the countertop between the deployed position and the clearance position, the vertical conveyance device configured to move the second galley cart between the lower cart compartment and the upper cart compartment behind the back wall.

6. The galley cart stowage system of claim 1, wherein the countertop is segmented into countertop sections movable independent from each other.

7. The galley cart stowage system of claim 1, wherein the countertop includes a hinge at an edge of the countertop, the countertop being pivotable at the hinge.

8. The galley cart stowage system of claim 1, wherein the lower cart compartment has a first width, the upper cart compartment has a second width narrower than the first width, wherein the lower cart compartment is configured to hold a greater number of the galley carts than the upper cart compartment.

9. The galley cart stowage system of claim 1, wherein the lower galley cart cavity is configured to receive a plurality of the galley carts, the upper galley cart cavity is configured to receive a plurality of the galley carts.

10. The galley cart stowage system of claim 1, wherein the lower galley cart cavity is defined by a lower left side wall, a lower right side wall, and a lower rear wall, and wherein the upper galley cart cavity is defined by an upper left side wall, an upper right side wall, and an upper rear wall.

11. The galley cart stowage system of claim 1, wherein the vertical conveyance device is one of a plurality of vertical conveyance devices extending between the lower cart compartment and the upper cart compartment to move corresponding galley carts between the lower cart compartment and the upper cart compartment.

12. The galley cart stowage system of claim 1, wherein the vertical conveyance device includes a track and a carriage movable along the track, the carriage movable along the track to move the second galley cart between the lower cart compartment and the upper cart compartment.

13. The galley cart stowage system of claim 1, further comprising a vertical connecting chamber between the lower cart compartment and the upper cart compartment, the countertop blocking access to the vertical connecting chamber in the deployed position, the countertop not blocking the vertical connecting chamber in the clearance position to allow movement of the second galley cart within the vertical connecting chamber between the lower cart compartment and the upper cart compartment.

14. The galley cart stowage system of claim 1, wherein the lower cart compartment is a double depth compartment configured to receive two rows of the galley carts between a lower rear wall and lower doors, and wherein the upper cart compartment is a double depth compartment configured to receive two rows of the galley carts between an upper rear wall and upper doors.

15. The galley cart stowage system of claim 1, wherein the lower cart compartment includes a lower door at a front of the lower cart compartment to close the lower galley cart cavity, the lower door opening to the galley to provide access to the lower galley cart cavity, and wherein the upper cart compartment includes an upper door at a front of the upper cart compartment to close the upper galley cart cavity, the upper door opening to the galley to provide access to the upper galley cart cavity.

16. The galley cart stowage system of claim 1, wherein the upper galley cart cavity is positioned within the galley at a height such that a top of the upper galley cart cavity is at most 2.6 meters from a floor of the galley.

17. An aircraft comprising:
a cabin having a cabin floor, the cabin having a cabin ceiling at a crown of the aircraft; and
a galley within the cabin, the galley including a plurality of walls including a first side wall, a second side wall, and a rear wall extending between the first side wall and the second side wall, the second side wall opposite the first side wall, the galley having a front opposite the rear wall, the galley having a galley footprint defined by the first side wall, the second side wall, the rear wall and the front, the galley including a galley cart stowage system for stowing galley carts, the galley cart stowage system comprising:
a lower cart compartment within the galley footprint defining a lower galley cart cavity configured to receive a first galley cart of the galley carts, the lower galley cart cavity defined by the first side wall, the second side wall and the rear wall, the lower cart compartment having a lower door at the front of the galley to close the lower galley cart cavity, the lower door opening to the cabin to provide access to the lower galley cart cavity from within the cabin;
an upper cart compartment within the galley footprint defining an upper galley cart cavity configured to receive a second galley cart of the galley carts, the upper galley cart cavity defined by the first side wall, the second side wall and the rear wall, the upper cart compartment having an upper door at the front of the galley to close the upper galley cart cavity, the upper door opening to the cabin to provide access to the upper galley cart cavity from within the cabin;

vertical conveyance devices extending between the lower cart compartment and the upper cart compartment to move the second galley cart between the lower cart compartment and the upper cart compartment; and a galley workspace having a workspace volume within the galley footprint located above the lower cart compartment and located below the upper cart compartment, the galley workspace having a countertop forming a working surface in the galley workspace, the countertop movable between a deployed position and a clearance position, the countertop located between the lower cart compartment and the upper cart compartment to block movement of the second galley cart between the lower cart compartment and the upper cart compartment in the deployed position, the countertop moved to the clearance position to form an opening between the lower cart compartment and the upper cart compartment to allow movement of the second galley cart through the workspace volume of the galley workspace between the lower cart compartment and the upper cart compartment.

18. The aircraft of claim 17, wherein the lower cart compartment has a first width, the upper cart compartment has a second width narrower than the first width, wherein the lower cart compartment is configured to hold a greater number of the galley carts than the upper cart compartment.

19. The aircraft of claim 17, further comprising a galley cooling system having a heat exchanger producing a cooled airflow, the galley cooling system including a lower supply duct extending between the heat exchanger and the lower cart compartment and an upper return duct extending between the heat exchanger and the upper cart compartment.

20. The aircraft of claim 17, wherein the countertop is aligned along a vertical axis with the lower cart compartment and the upper cart compartment in the deployed position, the countertop being offset from the lower cart compartment and the upper cart compartment in the clearance position.

21. The aircraft of claim 17, wherein the countertop includes a front edge and a rear edge, the rear edge being positioned a first distance from the rear wall in the deployed position, the rear edge being positioned a second distance from the rear wall in the clearance position, the second distance being greater than the first distance.

22. The aircraft of claim 17, wherein the galley workspace includes a back wall at a rear of the galley workspace, the back wall being parallel to and spaced apart from the rear wall of the galley, the back wall being movable with the countertop between the deployed position and the clearance position to change a spacing between the back wall and the rear wall, the vertical conveyance devices configured to move the second galley cart between the lower cart compartment and the upper cart compartment between the rear wall and the back wall in the clearance position.

23. A method of stowing galley carts in a galley of an aircraft, the method comprising:

positioning the galley carts in a lower galley cart cavity of a lower cart compartment below a countertop of a galley workspace forming a working surface in the galley workspace;

positioning the galley carts in an upper galley cart cavity of an upper cart compartment above the galley workspace;

moving the countertop from a deployed position to a clearance position to form an opening between the lower cart compartment and the upper cart compartment; and moving the galley carts between the upper cart compartment and the lower cart compartment in a generally vertical direction through the opening using a vertical conveyance device extending between the lower cart compartment and the upper cart compartment.

24. The method of claim 23, wherein said moving the countertop comprises sliding the countertop in a horizontal sliding direction.

25. The method of claim 23, wherein said moving the countertop further comprises moving a back wall of the galley workspace with the countertop between the deployed position and the clearance position, and wherein said moving the galley carts comprises moving the galley carts between the lower cart compartment and the upper cart compartment behind the back wall.

26. The method of claim 23, further comprising accessing at least one of food and beverage items in the galley carts in the upper galley cart cavity from within the galley.

27. The method of claim 23, further comprising opening upper doors of the upper cart compartment to access the galley carts in the upper galley cart cavity.

* * * * *